United States Patent
Wulf (10) Patent No.: US 11,130,481 B2
(45) Date of Patent: Sep. 28, 2021

(54) METHOD FOR ELECTRONICALLY CONTROLLING A PNEUMATIC BRAKING SYSTEM IN A VEHICLE, AND ELECTRONICALLY CONTROLLABLE PNEUMATIC BRAKING SYSTEM

(71) Applicant: WABCO Europe BVBA, Brussels (BE)

(72) Inventor: Oliver Wulf, Neustadt (DE)

(73) Assignee: ZF CV Systems Europe BV, Brussels (BE)

(*) Notice: Subject to any disclaimer, the term of this patent is extended or adjusted under 35 U.S.C. 154(b) by 282 days.

(21) Appl. No.: 16/329,222

(22) PCT Filed: Jul. 17, 2017

(86) PCT No.: PCT/EP2017/000859
§ 371 (c)(1),
(2) Date: Feb. 28, 2019

(87) PCT Pub. No.: WO2018/041384
PCT Pub. Date: Mar. 8, 2018

(65) Prior Publication Data
US 2019/0248350 A1    Aug. 15, 2019

(30) Foreign Application Priority Data

Aug. 31, 2016 (DE) ............ 10 2016 010 463.5

(51) Int. Cl.
*B60T 13/68* (2006.01)
(52) U.S. Cl.
CPC ................ *B60T 13/683* (2013.01)

(58) Field of Classification Search
CPC ........ B60T 8/1708; B60T 8/327; B60T 8/361; B60T 8/38; B60T 13/683; B60T 2270/40; B60T 2270/402; B60T 2270/413
See application file for complete search history.

(56) References Cited

U.S. PATENT DOCUMENTS

| 4,260,199 A | * | 4/1981 | Reinecke | B60T 7/12 303/127 |
| 5,342,119 A | * | 8/1994 | Smith | B60T 8/342 303/113.2 |

(Continued)

FOREIGN PATENT DOCUMENTS

| DE | 10036286 A1 | 2/2002 |
| DE | 102007023345 A1 | 11/2008 |

(Continued)

*Primary Examiner* — Bradley T King
(74) *Attorney, Agent, or Firm* — Leydig, Voit & Mayer, Ltd.

(57) ABSTRACT

A method for electronically controlling a pneumatic brake system in a vehicle includes determining that a failure or a defect has occurred in electronic actuation of wheel brakes of the pneumatic brake system, and electronically actuating a pilot valve via a redundancy signal in response to determining that the failure or the defect in the electronic actuation has occurred so as to actuate the wheel brakes in a redundant electropneumatic manner. The redundancy signal is specified in such a manner that the pilot valve alternately turns for a pulse time into a second switch position and for a pause time into a first switch position. The pilot valve outputs, as a pilot pressure, a low pressure level in the first switch position and a high pressure level in the second switch position. The wheel brakes are actuated using a service brake braking pressure that is dependent upon the pilot pressure.

21 Claims, 6 Drawing Sheets

(56) References Cited

U.S. PATENT DOCUMENTS

| | | | |
|---|---|---|---|
| 5,718,486 A * | 2/1998 | Vollmer | B60T 8/00 |
| | | | 303/15 |
| 7,008,025 B2 * | 3/2006 | McCann | B60T 8/323 |
| | | | 303/122.15 |
| 7,520,572 B2 | 4/2009 | Hatipoglu et al. | |
| 8,512,208 B2 | 8/2013 | Hilberer | |
| 8,731,795 B2 | 5/2014 | Frashure et al. | |
| 9,676,378 B2 | 6/2017 | Kiel et al. | |
| 9,764,724 B2 | 9/2017 | Kiel et al. | |
| 9,776,611 B2 | 10/2017 | Lenz et al. | |
| 9,802,593 B2 * | 10/2017 | Frashure | B60T 8/243 |
| 9,896,072 B2 | 2/2018 | Roters | |
| 2004/0032162 A1 * | 2/2004 | Ziegler | B60T 8/17554 |
| | | | 303/7 |
| 2012/0217794 A1 * | 8/2012 | Wieder | B60T 8/4818 |
| | | | 303/113.2 |
| 2013/0166158 A1 * | 6/2013 | Barlsen | B60T 7/12 |
| | | | 701/50 |
| 2019/0084540 A1 * | 3/2019 | Kasper | G08G 1/22 |
| 2019/0118786 A1 * | 4/2019 | Wulf | B60W 10/10 |
| 2019/0168724 A1 * | 6/2019 | VandenBerg, III | B60T 7/12 |
| 2019/0248349 A1 * | 8/2019 | Wulf | B60T 8/94 |
| 2019/0322256 A1 * | 10/2019 | Tha | B60T 8/323 |
| 2019/0337503 A1 * | 11/2019 | Otremba | B60T 8/1708 |
| 2020/0055511 A1 * | 2/2020 | Schwagmeyer | B60T 8/1708 |

FOREIGN PATENT DOCUMENTS

| | | |
|---|---|---|
| DE | 102011115128 A1 | 4/2012 |
| DE | 102010050578 A1 | 5/2012 |
| DE | 102010050580 A1 | 5/2012 |
| DE | 102013015949 A1 | 3/2015 |
| DE | 102013015971 A1 | 4/2015 |
| DE | 102014006614 A1 | 11/2015 |
| DE | 102014006615 A1 | 11/2015 |
| DE | 102014017683 A1 | 6/2016 |
| DE | 102015011296 A1 | 3/2017 |
| EP | 1730006 B1 | 12/2012 |
| EP | 2055541 B1 | 3/2013 |
| EP | 2532559 B1 | 5/2015 |
| WO | WO 2016045652 A1 | 3/2016 |

* cited by examiner

METHOD FOR ELECTRONICALLY CONTROLLING A PNEUMATIC BRAKING SYSTEM IN A VEHICLE, AND ELECTRONICALLY CONTROLLABLE PNEUMATIC BRAKING SYSTEM

CROSS REFERENCE TO RELATED APPLICATIONS

This application is a U.S. National Stage Application under 35 U.S.C. § 371 of International Application No. PCT/EP2017/000859 filed on Jul. 17, 2017, and claims benefit to German Patent Application No. DE 10 2016 010 463.5 filed on Aug. 31, 2016. The International Application was published in German on Mar. 8, 2018 as WO 2018/041384 A1 under PCT Article 21(2).

FIELD

The invention relates to a method for electronically controlling a pneumatic brake system in a vehicle, in particular a commercial vehicle, and also to an electronically controllable pneumatic brake system.

BACKGROUND

In vehicles, in particular commercial vehicles, having a pneumatic brake system, axle modulators that are allocated to the vehicle axles may be actuated electronically by a control unit (ECU) so as to output braking pressures. In this case, the electronic actuation is performed either in dependence upon a driver request that is specified by means of a foot brake valve or in dependence upon a vehicle desired deceleration that is specified in an automated manner. The axle modulators then pneumatically generate a corresponding service brake braking pressure that is output to brake cylinders of the service brakes of the brake system.

Alternatively, the axle modulators may also be actuated pneumatically in that a service brake control pressure that corresponds to the driver request is imposed onto the axle modulators by the foot brake valve and in dependence upon said service brake control pressure the respective axle modulator generates the corresponding service brake braking pressure for the service brakes by means of increasing the quantity of air. An ABS functionality is integrated into both variants with the result that it is possible to prevent the wheels locking during the braking procedure.

Multiple solutions are known in order to provide braking systems of this type also with a fall back level that may be actuated in an automated manner, and is able to engage in an automated manner in an emergency situation if the driver by way of example is not paying attention or not at the wheel. However, solutions of this type do not take into account preserving driving stability during a redundant braking procedure that is controlled in an automated manner and said braking procedure may be impaired in particular by means of a brake slip event. Since in the event of an electrical malfunction ABS control valves may not reliably be actuated and also it may not be possible for the axle modulators to react to a brake slip event, the driving stability in the case of a redundant braking procedure may not be preserved in all cases.

DE 10 2013 015 949 A1 describes a brake system for assisting a driver when negotiating bends, wherein it is provided to output a service brake braking pressure to service brakes of the brake system using an electronically controlled multi-directional control valve, wherein a service brake braking pressure is output even if no braking request exists from a foot brake valve as a brake encoder. The multi-directional control valve and the foot brake valve are connected via a shuttle valve (select high valve) to a relay valve that outputs the service brake braking pressure to the service brakes. The shuttle valve in this case only transmits the higher of the two pressures from the foot brake valve or the multi-directional control valve to the relay valve with the result that the electronic braking request of the multi-directional control valve may be overridden by means of the foot brake valve.

DE 10 2010 050 578 A1 or DE 10 2010 050 580 A1 disclose a brake system in which a braking request is specified via a foot brake valve or a brake pedal device. This braking request is converted into an electronic signal in a control unit and an axle modulator is actuated using the electronic signal, said axle modulator outputting the service brake braking pressure to the service brakes. If the electronics system fails, in the redundancy case the axle modulator is actuated pneumatically via compressed air lines using a service brake control pressure and in that way a service brake braking pressure is output to the service brakes. For this purpose the axle modulator comprises three solenoid valves and also a relay valve. Depending upon the position of the solenoid valves, the actuating pressure that is specified by the foot brake valve, the reservoir pressure from the pressure medium reservoir or the atmospheric pressure from a venting procedure is used as the service brake control pressure. As a consequence, in dependence upon a manual or electrical imposition the service brake braking pressure may be increased, maintained or reduced depending upon the switch position of the three solenoid valves, said switch position being specified electronically.

WO 2016/045652 A1 discloses an electropneumatic service brake device having a foot brake valve and the brake pedal position of said foot brake valve may be sensed and the actuating pressure that is output by said foot brake valve may be modified independently of a brake pedal position in order to actuate the axle modulators. For this purpose, a solenoid valve device having by way of example two 3/2 directional control valves is provided and a foot brake input pressure is introduced into the foot brake valve by means of said directional control valves depending upon the electronic request. The active foot brake input pressure is maintained via an additional holding valve. A control piston is mechanically moved in the foot brake valve pneumatically by means of the active foot brake input pressure with the result that an actuating pressure that corresponds to the pneumatic actuation is output by the foot brake valve, said actuating pressure being relayed to the axle modulators as the service brake control pressure. As a consequence, in the redundancy case in other words if the electrical actuation of the service brakes fails and if a manual actuation has not been performed by the driver a braking procedure may be performed via the foot brake valve and its pneumatic duct. Consequently, a quasi electronically controlled, mechanical-pneumatic actuation of the foot brake valve is provided.

A further mechanical actuation of the foot brake valve is disclosed by way of example in U.S. Pat. No. 7,520,572 B2 and EP 1 730 006 B1. In this case, a method is respectively disclosed in which the foot brake valve may be actuated not only by the brake pedal but also by an electronic control unit. An electronic brake system is accordingly provided whose service brakes are actuated by means of the foot brake valve and via an additional relay valve. The braking request may on the one hand be imposed via the brake pedal to the foot brake valve, on the other hand it may be specified independently thereof via a brake valve actuator that is arranged between the brake pedal and the foot brake valve. The brake valve actuator is controlled by means of the electronic control unit in that, if a control signal for braking the vehicle is present, a control pressure is output to the brake valve actuator, said brake valve actuator being embodied by way of example as a pneumatic valve, with the result that the foot brake valve is actuated.

DE 10 2013 015 971 A1 discloses a braking device in which the foot brake valve is pneumatically connected to the service brakes via a directional control valve. In a first switch position of the directional control valve, the actuating pressure that is generated by the foot brake valve by means of manual actuation is directly output to the service brakes. In a second switch position, a non-return valve is connected between the foot brake valve and the service brakes. The non-return valve renders it possible to increase the pressure that is produced by the foot brake valve at the service brakes, however said non-return valve prevents pressure of the service brakes from reducing or venting and consequently ensures that the service brake braking pressure that is built up is maintained.

EP 2 532 559 B1 discloses a brake system that comprises two pilot valves that are embodied as 2/2 directional control valves and also at least one select high valve. The pilot valves may be electronically switched in dependence upon a measured service brake control pressure in such a manner that a pressure medium that flows in from the pressure medium reservoir or a venting procedure to the select high valve are short circuited to a reservoir pressure. As a consequence, it is possible to increase or reduce the service brake braking pressure in an electrically controlled manner. The service brake control pressure may also be maintained by means of a corresponding switch position of the pilot valves. In addition, the actuating pressure that is specified by the driver by means of actuating the foot brake valve is also guided to the select high valve. The select high valve then outputs the higher of the two prevailing pressures to the service brakes, in other words either the reservoir input pressure or the foot brake input pressure or the actuating pressure that is provided by the corresponding pilot valve. Consequently, pressure may be increased, maintained or reduced using two pilot valves and a select high valve in an electronically controlled manner if a manual actuation is not performed by the driver.

EP 2 055 541 B1 discloses a driver assist system having a bistable and a monostable pilot valve. A spring accumulator of a parking brake may be aerated or vented via the bistable pilot valve in that in the case of a corresponding switch position of the bistable pilot valve either the pressure medium reservoir for releasing the spring accumulator or a venting for applying the spring accumulator are connected to a pneumatic control input of an axle modulator. The monostable pilot valve is arranged between the bistable pilot valve and the axle modulator and said monostable pilot valve permits the through-flow of the parking brake control pressure that is output by the bistable pilot valve to the axle modulator in a switch position and otherwise prevents a flow connection. In other words, in the second switch position of the monostable pilot valve, the prevailing parking brake control pressure is maintained at the axle modulator.

DE 10 2011 115 128 A1 discloses an ACC closed-loop control procedure that reduces the actuation of the wheel brakes when driving on a slope in that a switch is performed by a service brake control unit in lieu of a continuous pilot signal to an alternating pilot signal. As a consequence, the service brake control pressure is reduced with respect to a continuous actuation since a reduced average control pressure occurs that leads to a reduced braking effect.

DE 10 2014 017 683 A1 discloses a brake system having a pilot valve that is actuated by a service brake control unit. In this case, the service brake control unit generates a pilot signal with which the pilot valve may be switched back and forth between a first switch position and a second switch position. As a consequence, an average pressure level is set, wherein the average pressure level is set in such a manner that a low residual ripple occurs with the result that the axle modulator may be actuated using a preferably proportional control pressure and a uniform braking procedure is performed. ABS control valves are connected downstream of the axle modulator at the individual wheels, said ABS control valves preventing wheel lock-up if a brake slip event occurs. In the event of a failure or defect of the electrical actuation, it is possible to switch to a pneumatic fall back level in which a purely pneumatic actuation is performed via the axle modulators, wherein in the event of a failure of the electrical actuation of the ABS control valves, it is no longer possible to react to a brake slip event.

SUMMARY

In an embodiment, the present invention provides a method for electronically controlling a pneumatic brake system in a vehicle. The method includes determining that a failure or a defect has occurred in electronic actuation of wheel brakes of the pneumatic brake system, and electronically actuating a pilot valve via a redundancy signal in response to determining that the failure or the defect in the electronic actuation has occurred so as to actuate the wheel brakes in a redundant electropneumatic manner. The redundancy signal is specified in such a manner that the pilot valve alternately turns for a pulse time into a second switch position and for a pause time into a first switch position. The pilot valve outputs, as a pilot pressure, a low pressure level in the first switch position and a high pressure level in the second switch position. The wheel brakes are actuated using a service brake braking pressure that is dependent upon the pilot pressure. The pulse time and the pause time are set in such a manner that a pilot pressure results that initiates, at the wheel brakes, a service brake braking pressure that recurrently drops at least for a limit time below a limit pressure so as to initiate an intermittent braking procedure. The limit pressure and the limit time are selected for this purpose in such a manner that just specifying the pilot pressure ensures that a wheel that tends to lock rotates again.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide methods for electronically controlling a pneumatic brake system in a commercial vehicle with which it is possible with minimal outlay to perform a safe and reliable electronically controlled redundant braking procedure. Furthermore, embodiments of the invention provide electronically controllable pneumatic brake systems for commercial vehicles.

In accordance with the invention it is accordingly provided, after determining whether a failure or a defect has occurred in the electronic actuation of wheel brakes in a vehicle, in particular a commercial vehicle, to output a redundancy signal to a pilot valve, wherein the pilot valve thereupon outputs a pilot pressure on account of which it is possible to produce an intermittent braking procedure using the wheel brakes. In dependence upon the redundancy signal the pilot valve is switched back and forth for this purpose between two switch positions in such a manner that the pilot pressure oscillates back and forth between a low pressure level and a high pressure level, wherein in dependence upon the pilot pressure a consequently likewise oscillating service brake control pressure is output to the wheel brakes.

A pulse time in which the high pressure level is set by means of the switch position of the pilot valve, and a pause time in which the low pressure level is set by means of the switch position of the pilot valve, are selected in accordance with the invention in such a manner that the service brake braking pressure that is output to the wheel brakes recurrently drops at least for a limit time below a limit pressure. The limit pressure and also the limit time are selected in this case in such a manner that it may be exclusively ensured that a possibly locked wheel rotates again by means of this pressure reduction.

Advantageously, it is hence identified that in order to initiate an intermittent braking procedure at the pilot pressure controlled wheel brakes, a pilot pressure is to be set that causes the wheels to transfer for a short moment from a locked condition back into a rotating condition, in other words it is ensured that a locked wheel rotates again. Simultaneously, it is to be ensured that the vehicle is braked at a specified vehicle desired deceleration. Both may exclusively be ensured in accordance with the invention by means of setting the pilot pressure with the result that in the redundancy case, in other words in the event of a failure or a defect of the electrical actuation of the wheel brakes in which where applicable an electrical actuation of ABS control valves is also not possible, a braking procedure may be introduced using an alternative measure that likewise maintains the driving stability. The intermittent braking procedure may consequently also simultaneously replace a failed electrical brake slip control procedure. In other words, the redundant measure for maintaining or increasing the driving stability advantageously also functions if the ABS control valves or other electrical valves in the vehicle are not functioning.

Advantageously, a simple possibility is consequently provided for maintaining the driving stability in the redundancy case without much outlay. For this purpose, only the pilot valve, by way of example a 3/2 directional control valve, as well as a redundant electrical actuation, with other words a redundancy control unit, of the pilot valve are required. In this case, in accordance with the invention it is identified that in the redundancy case it is only important to transfer the vehicle safely into a safe state, in other words either to bring the vehicle to a standstill or to bring the vehicle to a suitable speed with which the vehicle may be driven to the side of the road or to a workshop. Further components that are not really required for rapidly and safely braking the vehicle in such a malfunction event or redundancy case, can be omitted, in particular components that ensure a smoothly gradual braking or that a braking effect is determined or that a braking procedure is without jerk or such components that ensure a low degree of wear, a low consumption of air or a low emission of noise. As the redundancy case only represents an exception that only occurs very rarely during the serviceable life of the vehicle, it is not essential that components relevant for the redundancy case be low-noise or low-wear.

Consequently, in contrast to the prior art, the pilot valve does not output a quasi-constant average pilot pressure by means of which a specific braking effect having only a low residual ripple is to be achieved in order to brake the vehicle comfortably in the normal operation. On the contrary, in accordance with the invention the ripple of the pilot pressure or rather of the service brake braking pressure is actually utilized in the redundancy case in order to maintain or to increase the driving stability in that the service brake braking pressure is recurrently automatically reduced at all the wheels to such an extent that it is possible for a wheel that tends to lock to rotate again for a short time.

The low pressure level in the first switch position is in this case by way of example specified by means of an actuating pressure, which is output by a foot brake valve, or by means of an atmospheric pressure in that either the foot brake valve or a pilot venting are connected to a first pilot input of the pilot valve. A second pilot input is connected by way of example to a pressure medium reservoir of a braking circuit of the vehicle and the high pressure level in the second switch position is specified via said second pilot input. In the respective switch positions, a switch is then made between the first or the second pilot input with the result that the corresponding pilot pressure that oscillates between the high and the low pressure level is provided.

A pilot model, by way of example a corresponding software having stored parameters of the brake system, is stored on the redundancy control unit in order to set the suitable pulse times and pause times. The pilot model therefore initially calculates from a vehicle desired deceleration a pilot pressure that is to be output by the pilot valve and said pilot pressure is used to achieve this vehicle desired deceleration, said vehicle desired deceleration being specified in an automated manner in the redundancy case by the redundancy control unit, and the vehicle is braked into a safe state, by way of example to standstill or to a specific speed on the basis thereof.

The pulse time and the pause time are subsequently calculated from the pilot pressure taking into account individual vehicle parameters, by way of example a vehicle mass, a trailer state and a valve characteristic, and also the low pressure level and the high pressure level, said pulse time and pause time being used to actuate the pilot valve in order to achieve the vehicle deceleration. Moreover, it is taken into account that the pilot pressure is set in such a manner that the service brake braking pressure recurrently drops at least for the limit time below the limit pressure in order to fulfil the condition for the wheels to start to rotate again in the case of a minimal frictional value.

In this case, the limit time may be set by way of example to 0.25 s and the limit pressure may be set to 1 bar. Under these prerequisites using the pilot model by way of example pulse times of 0.1 s or 0.3 s and pause times of 0.2 s or 0.45 s occur with which an intermittent braking procedure of this type may be achieved in order to maintain the driving stability.

Consequently, the pause time and the pulse time may be advantageously set by means of a simple software implementation via the pilot model in such a manner that using the resulting pilot pressure the vehicle desired deceleration may be achieved taking into account the limit time and also the limit pressure. For this purpose, only simple conversions are required.

The pilot pressure is output either as a service brake control pressure to axle modulators of the brake system, wherein the axle modulators increase the quantity of air to the pilot pressure and output said pilot pressure to the wheel brakes as a service brake braking pressure. Alternatively, the pilot valve may also be arranged downstream of the axle modulators with the result that the pilot pressure is output directly to the wheel brakes as the service brake braking pressure. In both cases, a braking effect is achieved by the wheel brakes in dependence upon the pilot pressure that is output by the pilot valve.

In accordance with one advantageous further development it is provided to reliably set the pulse time and the pause times in that whilst implementing an intermittent braking procedure in the redundancy case a currently prevailing vehicle actual deceleration is compared to the vehicle desired deceleration that is specified by the redundancy control unit. If a deviation occurs, the pilot model may be accordingly adjusted with the result that pulse times and the pause times occur with which the vehicle actual deceleration is brought closer to the vehicle desired deceleration, furthermore taking into account the limit time and the limit pressure.

In this case, it may be advantageously furthermore taken into account whether the vehicle parameters and/or the low pressure level and/or the high pressure level have changed prior to or during the intermittent braking procedure. As a consequence, inaccuracies may be advantageously faded out, which occur either during the intermittent braking procedure because the high pressure level in the pressure medium reservoir changes during a braking procedure or were already previously present because by way of example a change of the vehicle mass on account of a changed load or a change of the trailer state had not been stored. Inaccuracies of this type may be balanced out in a simple manner using a closed-loop control procedure of this type.

Advantageously, the pulse times and the pause times are coordinated by way of example in the pilot model in such a manner that the driving stability is maintained by means of the intermittent braking procedure during typical driving situations. In this case, the term "typical driving situation" is understood to mean that the vehicle is moving on a surface on which it is at least possible to achieve minimum frictional values of 0.6. In this case said surface is preferably wet or dry concrete or asphalt.

Advantageously, this covers approximately 95% of usual driving situations in which an automated driving procedure is also performed as standard. In the remaining driving situations, by way of example on snow, ice, cobblestones or in heavy rain, lower frictional values are achieved at which the automated driving procedure is not common or rather is to be limited with regard to the redundant operation, so that a coordinating procedure may be omitted for them.

The redundant operation via the redundancy control unit may be identified in this case by way of example if the redundancy control unit is supplied a corresponding diagnostic signal, by way of example from a service brake control unit, an assistance control unit and/or if the redundancy control unit itself identifies in some manner that a defect occurs in the electronic actuation.

Preferably the pilot valve may be arranged on the front axle and/or on the rear axle of the vehicle in order to achieve a braking effect at the respective vehicle axle depending upon the application in the redundancy case and simultaneously to maintain or to increase the driving stability.

In order to increase the reliability in the redundancy case, the redundancy control unit may be supplied by an additional second energy source and/or by a generator, by way of example an alternator, and/or by a short-term storage device and/or by a high voltage storage device that are independent from a first energy source, which ensure an electrical supply to the brake system in the normal operation.

In the normal operation, the wheel brakes can be actuated either in an electropneumatic brake system or in a purely pneumatic brake system. In an electropneumatic brake system, the axle modulators are actuated electrically by the service brake control unit, said axle modulators then generating a corresponding service brake braking pressure and outputting it to the wheel brakes. In a purely pneumatic brake system, the braking request in the normal operation is specified mainly by the driver. Only assistance systems, by way of example a distance controlling system (ACC) may electrically specify a braking request (XBR) that may be accordingly pneumatically implemented via the pilot valve.

If the brake system switches into the redundancy case, the redundancy control unit brakes as described above in that said control unit actuates the pilot valve using the redundancy signal. In a purely pneumatic brake system this may occur by virtue of the fact that both the signal that is specified by the corresponding assistance system as well as the redundancy signal are transmitted independently of one another to an electrical pilot control input. The pilot control input then comprises by way of example a double coil with the result that a solenoid armature of the pilot valve may be actuated independently of one another.

Alternatively, the signal that is specified by the corresponding assistance system may also be provided to the redundancy control unit that then accordingly relays in a decoupled manner, for example via diodes, either said assistance signal or of the redundancy signal to the pilot valve in order to generate a pilot pressure.

Figure 1:
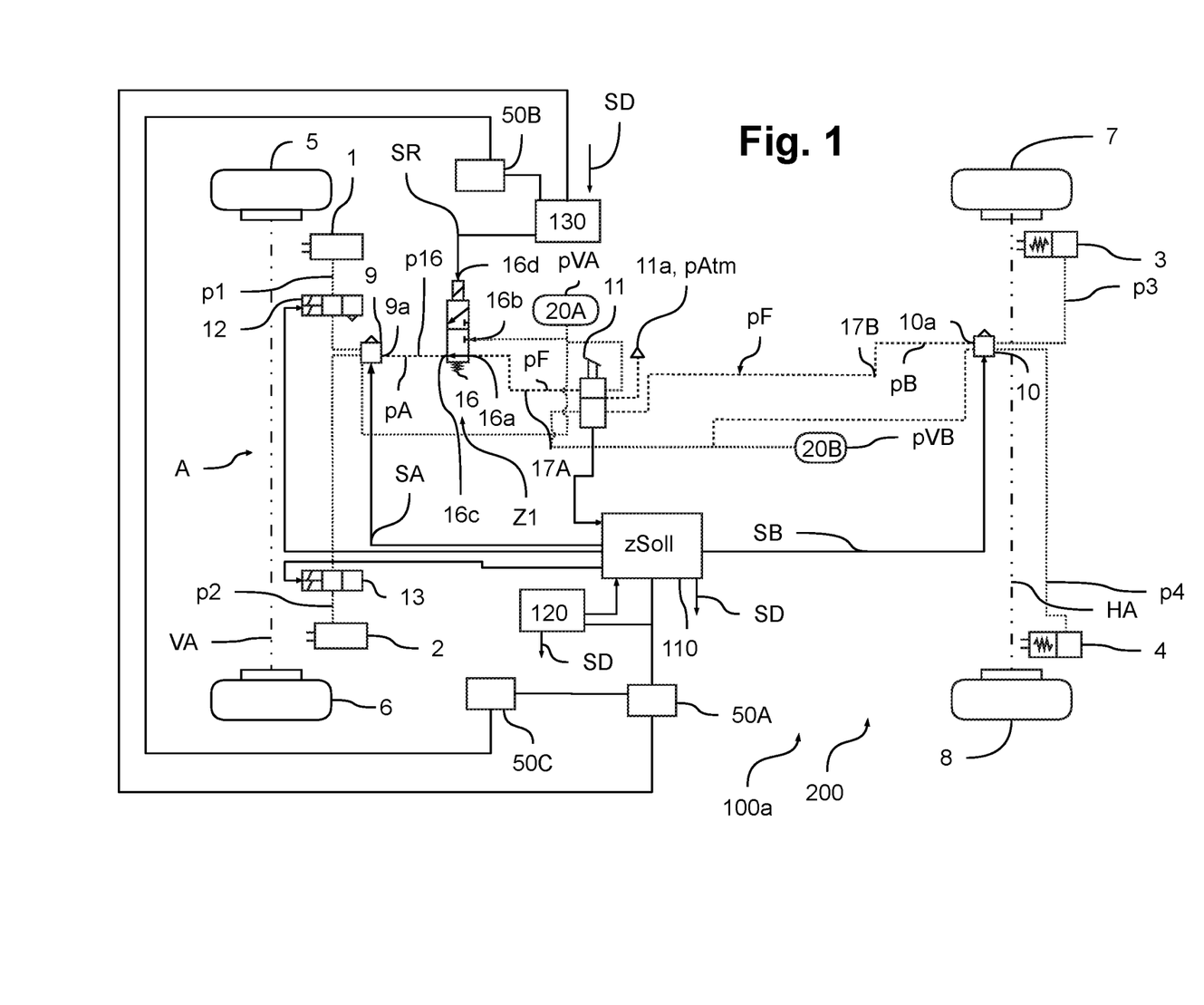
FIG. 1 illustrates, as a block diagram, an electropneumatically controlled brake system having a pilot valve according to an embodiment of the invention.

FIG. 1 illustrates a section of an electropneumatic brake system 100*a* of a vehicle 200, in particular a commercial vehicle, as a block diagram, wherein the electropneumatic brake system is embodied as an EBS brake system 100*a*, in other words a braking specification takes place electrically in the normal operation. The EBS brake system 100*a* comprises for this purpose multiple wheel brakes 1, 2, 3, 4 that are used for the purpose of braking the vehicle 200. In order to perform the braking procedure, two braking circuits A, B are provided and a pressure medium reservoir 20A, 20B is allocated to said braking circuits respectively in order to supply the respective braking circuits A, B with a pressure medium and consequently to render it possible to build up a service brake braking pressure p1, p2, p3, p4 for the respective wheel brakes 1, 2, 3, 4 of the vehicle 200. A corresponding reservoir pressure pVA, pVB prevails in each pressure medium reservoir 20A, 20B, wherein a reservoir pressure pVA, pVB of by way of example 12 bar prevails in the first and in the second pressure medium reservoir 20A, 20B.

In a first braking circuit A, the wheel brakes 1, 2 are arranged on the wheels 5, 6 of a front axle VA, wherein the wheel brakes 1, 2 are embodied as service brakes. The wheel brakes 3, 4 on a rear axle HA are embodied as combined spring accumulator brakes and service brakes with the result that the wheels 7, 8 of the rear axle HA may be braked independently of one another on the one hand via a second braking circuit B via a service brake function and moreover also via a parking brake function that is not illustrated.

In the first two braking circuits A, B, the service brake braking pressures p1, p2, p3, p4 are generated in the normal operation via electrically controlled axle modulators 9, 10, in that control signals SA, SB are transmitted electrically by a service brake control unit 110 (ECU) to the axle modulators 9, 10 that then—supplied by the corresponding pressure medium reservoir 20A, 20B—output a specific service brake braking pressure p1, p2, p3, p4. The level of the service brake braking pressures p1, p2, p3, p4 results in particular from a requested vehicle desired deceleration zSoll that in accordance with this exemplary embodiment results from a request that is specified manually by the driver via a foot brake valve 11 or from an assistance control unit 120 (ADAS-ECU), (A)dvanced-(D)river-(AS)sistance) that is provided so as to control the vehicle 200 in an automated manner.

It is possible via a corresponding electrical actuation of the respective axle modulator 9, 10 to react to an ABS brake slip event at the wheels 5, 6, 7, 8 of the two vehicle axles VA, HA, wherein for this purpose additional ABS control valves 12, 13 are actuated at the front axle VA, said ABS control valves may maintain or reduce the service brake braking pressure p1, p2 in the normal operation in the case of an identified brake slip event. The service brake braking pressures p3, p4 are accordingly directly adjusted at the rear axle HA by the second axle modulator 10 in the case of an identified brake slip event.

In the event of a failure or a defect D in the electronic actuation of the two axle modulators 9, 10, a pneumatic fall-back level may be switched to in the EBS brake system 100a in accordance with FIG. 1 in that an actuating pressure pF that is output pneumatically by the driver actuating the foot brake valve 11 is output as a pneumatic service brake control pressure pA, pB at the respective axle modulator 9, 10 of the respective braking circuit A, B. A first service brake control pressure pA is guided in this case to a first pneumatic control input 9a at the first axle modulator 9 and a second service brake control pressure pB is guided to a second pneumatic control input 10a at the second axle modulator 10, wherein the pneumatic control inputs 9a, 10a are released in the redundancy case so as to actuate the respective axle modulator 9, 10.

The respective axle modulator 9, 10 increases the service brake control pressure pA, pB accordingly and outputs a service brake braking pressure p1, p2, p3, p4 that has been increased by means of an amount of air to the corresponding wheel brakes 1, 2, 3, 4. Consequently, it is possible to switch from an electronic actuation of the axle modulators 9, 10 in the pneumatic redundancy case to a pneumatic actuation by means of the foot brake valve 11.

Furthermore, a pilot valve 16 is provided in the EBS brake system 100a, said pilot valve being arranged in a first control line 17A that is allocated to the first braking circuit A and that connects the foot brake valve 11 to the first axle modulator 9 on the front axle VA. Alternatively or in addition thereto, a pilot valve 16, not illustrated, may also be arranged in a second control line 17B that is allocated to the second braking circuit B and that connects the foot brake valve 11 to the second axle modulator 10 on the rear axle HA.

The pilot valve 16 may be embodied by way of example as a monostable, electrically controllable 3/2 directional control valve, by way of example as a solenoid valve, which may be brought into two switch positions Z1, Z2 and that is used for the purpose of specifying in the respective control line 17A, 17B a service brake control pressure pA, pB at the respective axle modulator 9, 10.

A first pilot input 16a of the pilot valve 16 is connected in accordance with FIG. 1 to the foot brake valve 11 and a second pilot input 16b is connected to the first pressure medium reservoir 20A that is allocated to the first braking circuit A. A pilot output 16c that outputs a pilot pressure p16 is connected to the first pneumatic control input 9a on the first axle modulator 9 with the result that the first service brake control pressure pA for the first braking circuit A that is identical to the pilot pressure p16 in this exemplary embodiment is either specified in dependence upon the actuating pressure pF or in dependence upon the first reservoir pressure pVA depending upon the switch position Z1, Z2. A pilot control input 16d of the pilot valve 16 is electrically connected to a redundancy control unit 130 that assumes the control of the pilot valve 16 in this embodiment.

In the first switch position Z1 of the pilot valve 16, the actuating pressure pF that is generated in dependence upon the driver actuation is guided through to the pilot output 16c and is output as a pilot pressure p16 with the result that said pilot pressure prevails at the first pneumatic control input 9a as the first service brake control pressure pA. In the second switch position Z2 of the pilot valve 16, the first pressure medium reservoir 20A is connected to the pilot output 16c with the result that the first reservoir pressure pVA that prevails in the first pressure medium reservoir 20A is output as the pilot pressure p16.

Consequently, in the first switch position Z1 a service brake braking pressure p1, p2 that corresponds to the driver request is output at the respective wheel brakes 1, 2 by means of the first axle modulator 9. In the case of a foot brake valve 11 not being actuated, switching the pilot valve 16 into the first switch position Z1 therefore leads automatically to a venting procedure of the first control line 17A since the actuating pressure pF is reduced to approximately atmospheric pressure pAtm via a venting connection 11a at the foot brake valve 11. Accordingly, a lower first service brake control pressure pA and a lower service brake braking pressure p1, p2 is also output to the respective wheel brakes 1, 2 of the front axle VA, the vehicle 200 is consequently not braked at least in the redundancy case in the first braking circuit A. Since the actuating pressure pF is also output via the second control line 17B to the rear axle HA, a lower service brake braking pressure p3, p4 is also set at said rear axle.

Conversely, in the second switch position Z2 a service brake braking pressure p1, p2 that corresponds to the first reservoir pressure pVA is generated at the front axle VA. Since normally a high first reservoir pressure pVA prevails—by way of example 12 bar—the second switch position Z2 therefore leads to a maximum actuation of the respective wheel brakes 1, 2 at the front axle VA. Consequently, it is achieved in a simple way that the vehicle 200 may be braked at least at the front axle VA with a maximum braking effect in an electronically controlled manner in the case of a second switch position Z2 being set. The wheel brakes 1, 2 are then applied initially continuously using a uniform service brake braking pressure p1, p2. In accordance with FIG. 1, the rear axle HA continues to be braked in dependence upon just the actuating pressure pF.

Hence, depending upon the switch position Z1, Z2, the pilot valve 16 outputs as pilot pressure p16 a high pressure level pHigh, i.e. the first reservoir pressure pVA, or a low pressure level pLow, i.e. the atmospheric pressure pAtm, or in case of a driver request the corresponding actuating pressure pF.

In the redundancy case, at least at the front axle VA an adjustment of the service brake braking pressure p1, p2 to the prevailing first service brake control pressure pA is always provided automatically, said first service brake control pressure pA being determined by means of the switch position Z1, Z2 of the pilot valve 16. At least if the pilot valve 16 is embodied in its simplest variant as a monostable 3/2 directional control valve, maintaining the service brake braking pressure p1, p2 after switching the pilot valve 16 or after reducing the braking request is not possible. The pilot valve 16 then only ensures that in the event of an emergency in the case of a failure of the electronics system a guaranteed braking procedure into a safe state may be performed electronically in a redundant manner.

The procedure of setting the corresponding switch position Z1, Z2 of the pilot valve 16 in accordance with the embodiment in FIG. 1 is controlled by means of a redundancy control unit 130 (redundancy ECU) that may engage in an electrical redundant manner into the braking procedure by way of example in the case of an electrical failure of the assistance control unit 120 and/or the service brake control unit 110 and/or the corresponding axle modulator 9, 10, in that said redundancy control unit 130 outputs a redundancy signal SR via which the pilot valve 16 is energized. A failure of the service brake control unit 110 and/or the assistance control unit 120 and/or the electronic actuation of the axle modulators 9, 10 may be determined in this case by way of example via a diagnostic signal SD. The diagnostic signal SD may be determined in a selfcheck procedure by the corresponding control unit 110, 120.

In order to ensure a supply of energy in the redundancy case to the redundancy control unit 130, multiple possibilities are provided. In accordance with one embodiment, as is illustrated in FIG. 1 a first energy source 50A is provided that supplies both the service brake control unit 110, the assistance control unit 120 and where applicable also the redundancy control unit 130 with energy and also a second energy source 50B that likewise or exclusively supplies the redundancy control unit 130. The first energy source 50A and the second energy source 50B are both connected to a generator 50C, by way of example an alternator of the commercial vehicle 200.

In the event of a failure of the first energy source 50A in which the electropneumatic brake system 100a can no longer be electrically controlled via the service brake control unit 110 and the axle modulators 9, 10, an electrically redundant actuation is consequently ensured via the redundancy control unit 130 since the second energy source 50B is able to compensate for the failure.

Alternatively, only the first energy source 50A that is connected to the generator 50C may be used, said energy source being connected via a fuse to the service brake control unit 110 and the assistance control unit 120 and via a further fuse to the redundancy control unit 130.

Figure 2A:
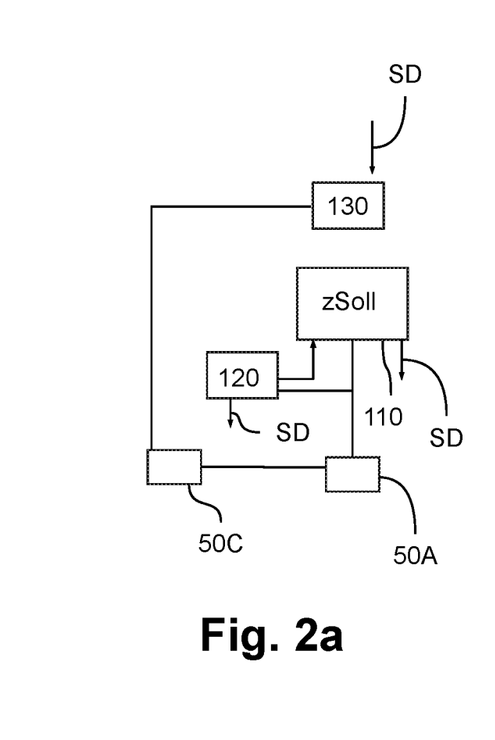
FIGS. 2a,b,c illustrate variants for supplying energy to the electropneumatically controlled brake system in accordance with FIG. 1.

In accordance with an alternative embodiment that is illustrated in FIG. 2a, it is provided to connect the redundancy control unit 130 in a corresponding manner directly to the generator 50C and to ensure an energy supply via said connection, and to connect the service brake control unit 110 and the assistance control unit 120 to the first energy source 50A. The generator 50C and the first energy source 50A are in this case separated from one another in such a manner that a short circuit in the generator 50C does not necessarily cause a short circuit in the first energy source 50A, and vice versa, with the result that the two may provide energy in the redundancy case independently of one another.

Figure 2B:
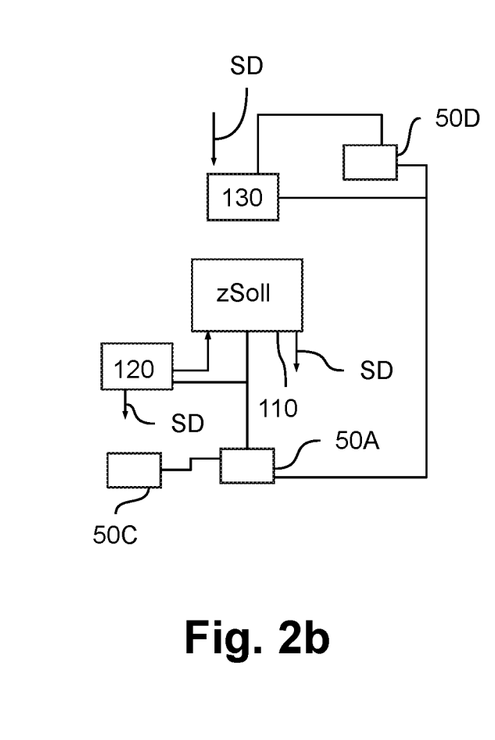

In accordance with an embodiment that is illustrated in FIG. 2b, it is provided to use a short-term storage device 50D, by way of example a capacitor, in particular a power cap, as an energy source, said storage device being charged by the first energy source 50A in the normal operation. If the first energy source 50A fails, the charged short-term storage device 50D is used as an energy source for the redundancy control unit 130.

Figure 2C:
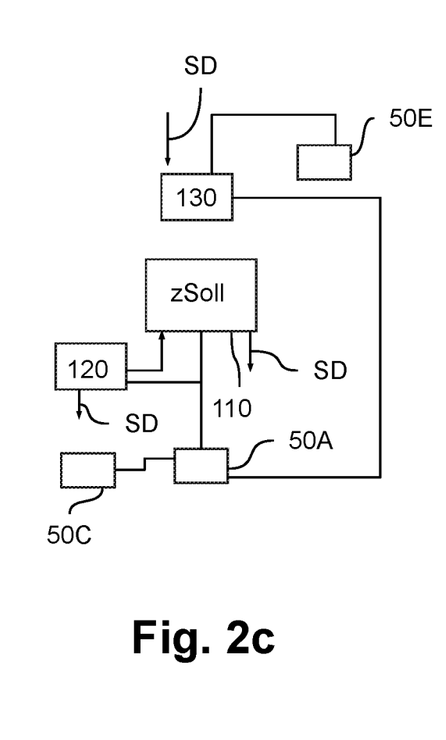

In accordance with a further embodiment, in accordance with FIG. 2c it is provided to use a high voltage storage device 50E as a redundant energy supply, said storage device being used in hybrid vehicles as an energy source for a drive. This high voltage storage device 50E is likewise independent of the first energy source 50A and may consequently be used as a redundant energy source for the redundancy control unit 130.

Alternatively, an additional redundant vehicle electrical system may also be constructed.

In the first switch position Z1, the pilot valve 16 is not energized, in other words the pilot valve 16 is not actuated by the redundancy control unit 130 using the redundancy signal SR. This first switch position Z1 is consequently a stable switch position into which the pilot valve 16 falls automatically back without a specified redundancy signal SR, which may be achieved by way of example by means of a spring preloading arrangement. Hence, even in case of a failure of the redundancy control unit 130, the driver continues to have the possibility to intervene into the braking procedure. Moreover, an undesired braking procedure in the case of a power failure or a defective actuation, by way of example an interruption of the electrical connection, is prevented. The second switch position Z2 is caused by means of outputting a corresponding redundancy signal SR that ensures the pilot valve 16 is energized.

In order to maintain, in the redundancy case, a driving stability of the commercial vehicle 200, since the ABS control procedure may no longer be performed via the ABS control valves 12, 13 on account of the electrical failure in the service brake control unit 110, the assistance control unit 120 and/or the electrical actuation of the axle modulators 9, 10 and consequently it is not possible to react in this manner to a brake slip event, the pilot valve 16 is actuated in a pulsed manner by the redundancy control unit 130 in accordance with the invention, by way of example with a pulse-width modulated redundancy signal SR, in such a manner that an intermittent braking function SF is embodied. In other words, the pilot valve 16 is alternately switched between the first switch position Z1 and the second switch position Z2.

As a consequence, the pilot pressure p16 that is output and consequently also the first service brake control pressure pA are not constant but rather oscillate back and forth between the actuating pressure pF (first switch position Z1) and the first reservoir pressure pVA (second switch position Z2). If a manual actuation of the foot brake pedal 11 is not performed in the redundancy case, the pilot pressure p16 or first service brake control pressure pA consequently oscillate back and forth between the atmospheric pressure pAtm, which is specified by the aerating connection 11a, and the first reservoir pressure pVA. The lines and valves that have a through flow in this case ensure a type of low pass filter that ensures that the pilot pressure p16 or the first service brake control pressure pA increase or decrease less intensely when switching back and forth between the two switch positions Z1, Z2 with the result that the actuating pressure pF or the first reservoir pressure pVA are not entirely achieved in the respective switch position Z1, Z2.

Figure 3:
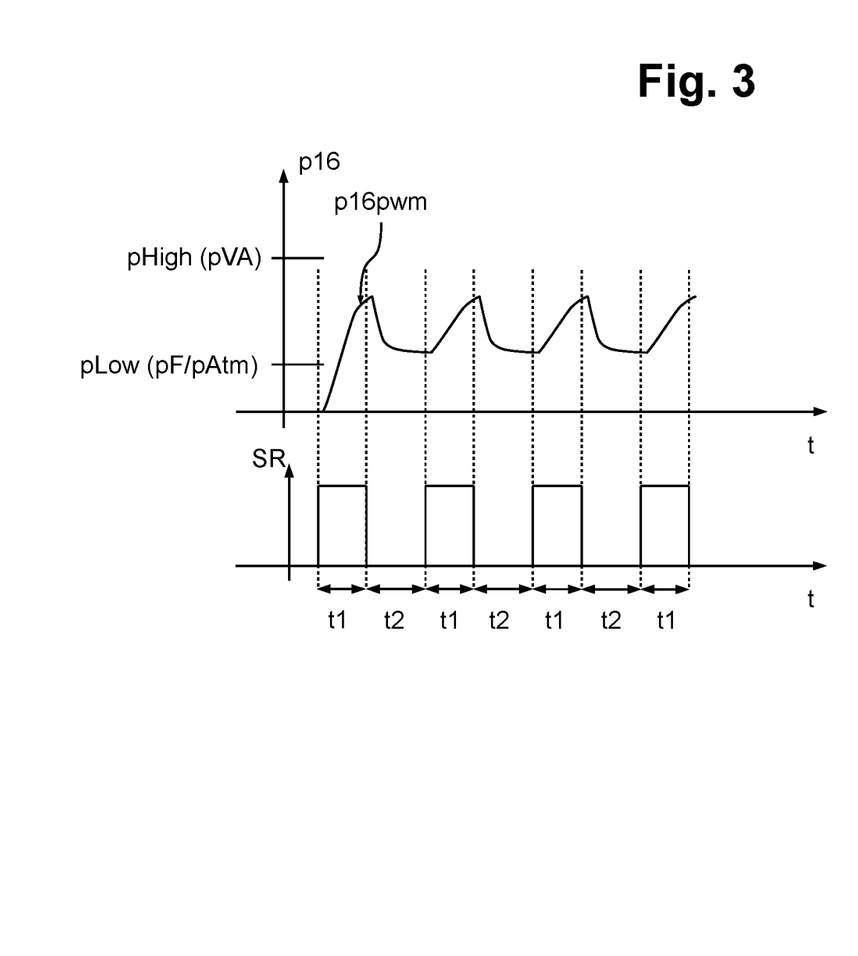
FIG. 3 illustrates a temporal curve of a pulsed pilot pressure in a brake system in accordance with FIG. 1.

A temporal curve of the pilot pressure p16 of this type is illustrated in an exemplary manner in FIG. 3, wherein a pilot pressure curve p16pwm occurs by means of the pulse width modulation (PWM) of the redundancy signal SR, said pilot pressure curve in particular being dependent upon a pulse time t1 that indicates the duration of a pulsed actuation via the redundancy signal SR, in other words the second switch position Z2, and upon a pause time t2 that indicates the duration therebetween in the non-energized state of the pilot valve 16 in other words in the first switch position Z1. The pilot pressure curve p16pwm oscillates back and forth between the actuating pressure pF (where applicable the atmospheric pressure pAtm) and the first reservoir pressure pVA with the result that a different pilot pressure p16 or first service brake control pressure pA is output to the first axle modulator 9 depending upon the point in time t.

The pulse time t1 and the pause time t2 are selected in accordance with the invention in such a manner that an intermittent braking procedure SF occurs. In order to achieve this, the pilot pressure p16 is set via the pulse time t1 and the pause time t2 in such a manner that actually some amount of ripple of the pilot pressure curve p16pwm and consequently also the first service brake control pressure pA remains. The setting is selected in this case in such a manner that in all typical driving situations it is ensured that after the wheels 5, 6 of the front axle VA have possibly locked, it is ensured that the wheels 5, 6 rotate again without a check being required in this case. This is in particular then the case for all typical driving situations if in particular in the case of a vehicle speed of 70 km/h the service brake braking pressure p1, p2 and also the first service brake control pressure pA at the wheel brakes 1, 2 of the front axle VA recurrently is below a service brake limit pressure pGrenz of 1 bar at least over a limit time tGrenz of approximately 0.25 s.

A typical driving situation is understood in this case to be by way of example a wet or a dry road surface having for example concrete or asphalt and a frictional value f in the worst case of 0.6 to 0.8. Since an autonomous control procedure is only limited in the normal case in the case of by way of example ice, snow, heavy rain or cobblestones, in other words in the case of a lower frictional value f than 0.6, the intermittent braking procedure SF is not to be adjusted to such situations. On the contrary, it is ensured that a redundant intermittent braking procedure SF may be initiated only for typical driving situations, for example journeys on a freeway in the case of a wet or dry road surface. Consequently, a journey with a frictional value f of at least 0.6 is understood to be a typical driving situation.

In order to determine the pulse time t1 and also the pause time t2 for initiating the intermittent braking procedure SF, initially a vehicle desired deceleration zSoll, which is specified by the redundancy control unit 130 in the redundancy case, for braking the commercial vehicle 200 into a safe state, for example bringing the vehicle to standstill or to a safe vehicle speed vFzg, is converted into a pilot pressure p16 that is to be output. For this purpose, it is taken into account that the first service brake control pressure pA or the service brake braking pressure p1, p2 is to recurrently fall below the service brake limit pressure pGrenz for the limit time tGrenz in order to ensure the wheels 5, 6 at the front axle VA rotate again.

The pulse time t1 and also the pause time t2 may be determined by the redundancy control unit 130 using a pilot model VM with reference to this information and with the knowledge of valve characteristics C of the electropneumatic brake system 100a and also the first reservoir pressure pVA, the actuating pressure pF and also optionally also a vehicle mass M and a trailer state ZA. The pilot model VM may be determined by way of example with reference to previous tests and may comprise various characteristic curves.

Exemplary values for the pulse time t1 and the pause time t2 that result from the pilot model VM for the electropneumatic brake system 100a in accordance with FIG. 1 are by way of example t1=0.1 s and t2=0.23 s in the case of a first reservoir pressure pVA of between 8.5 bar and 12.5 bar. These values for normal commercial vehicles 200 in typical driving situations, in other words frictional values of greater than 0.6, fulfill the mentioned conditions that the wheels 5, 6 in the case that they are possibly locked may rotate again since for at least 0.25 s a service brake braking pressure p1, p2 of below 1 bar is recurrently achieved and also simultaneously an intermittent braking procedure SF is initiated. In this case, a vehicle deceleration zSoll of 1.2 m/s$^2$ and also a good ability to steer may be ensured and on average a first service brake control pressure pA is output that amounts to approximately 1 bar. In the case of t1=0.32 s and t2=0.45 s a vehicle desired deceleration zSoll of 2.4 m/s$^2$ and a first service brake control pressure pA of on average approximately 2.2 bar is achieved, wherein in this case the mentioned conditions for the wheels 5, 6 to rotate again are also fulfilled in the case of a minimum frictional value f.

By means of setting the pulse times t1 and the pause times t2 a vehicle deceleration zSoll is set by means of which the commercial vehicle 200 in the redundancy case is brought to standstill or to a safe state, wherein an average service brake control pressure pA or service brake braking pressure p1, p2 is set, which comprises a desired residual ripple in order to be able to initiate the intermittent braking procedure SF for maintaining the driving stability in the case of a typical driving situation.

Consequently, it is possible to avoid the wheels 5, 6 locking up even if in the redundancy case the ABS control valves 12, 13 are not functioning since said ABS control valves may not be actuated electrically by the service brake control unit 110 on account of the failure or of the defect D. It is consequently not necessary for the ABS control valves 12, 13 to function correctly to maintain the driving stability. On the contrary, a pilot pressure p16 or a first service brake control pressure pA is directly provided with which it is possible to ensure this driving stability.

In order to correct errors in the pilot model VM, an additional acceleration sensor may be provided or a vehicle actual deceleration z1st may be determined from a speed of the rear axle HA which allow to determine whether the vehicle desired deceleration zSoll that is requested by the redundancy control unit 130 in the redundancy case, on the basis of which the pulse times t1 and the pause times t2 are calculated, is actually achieved. If this is not the case, because by way of example a load or a trailer state ZA differs considerably, the pilot model VM may also be corrected with the result that the pulse time t1 and the pause time t2 may be accordingly adjusted. Consequently, an additional control procedure of the vehicle desired deceleration zSoll may take place that increases the reliability of the intermittent braking procedure SF.

At the start of an intermittent braking procedure SF in the redundancy case the pilot model VM may assume by way of example that vehicle mass M and that trailer state ZA which most recently have been reported by the service brake control unit 110 in order to determine the pulse time t1 and the pause time t2.

The pulse time t1 and the pause time t2 may in this case be designed in such a manner that acceptable values for the vehicle desired deceleration zSoll, the driving stability and the ability to steer may be ensured in the case of a redundant engagement. This is advantageous in particular in those situations where a brake slip control procedure via the service brake control unit 110 and the electrical actuation of the axle modulator 9, 10 via the control signal SA, SB are not functioning because an electrical malfunction occurs and consequently also the ABS control valves 12, 13 which in the normal case correct a brake slip event can no longer be actuated.

In order to achieve the steady state oscillation for achieving the intermittent braking procedure SF more rapidly, it may be provided to select the first pulse time(s) t1 at the start of the intermittent braking procedure SF to be longer, with the result that the first service brake control pressure pA or the service brake braking pressure p1, p2 increase more rapidly for the front axle VA to the required pressure level.

The first reservoir pressure pVA decreases after a longer intermittent braking procedure SF on account of the continuous switching between the first and the second switch position Z1, Z2 since as a consequence the pressure medium is consumed more rapidly. This may be accordingly taken into account in the pilot model VM in that in the case of an enduring intermittent braking procedure SF the pulse time t1 is accordingly increased in order to maintain the pressure level. This influence may also be more precisely readjusted by means of observing the vehicle actual deceleration z1st.

In FIG. 1, the pilot valve 16 may also be arranged between the axle modulator 9, 10 and the respective wheel brake 1, 2, 3, 4 with the result that the pilot pressure p16 that is output by the pilot valve 16 is not output as the service brake control pressure pA, pB at the respective axle modulator 9, 10 in the respective braking circuit A, B but rather is output directly as the service brake braking pressure p1, p2, p3, p4 to the wheel brakes 1, 2, 3, 4.

Figure 4:
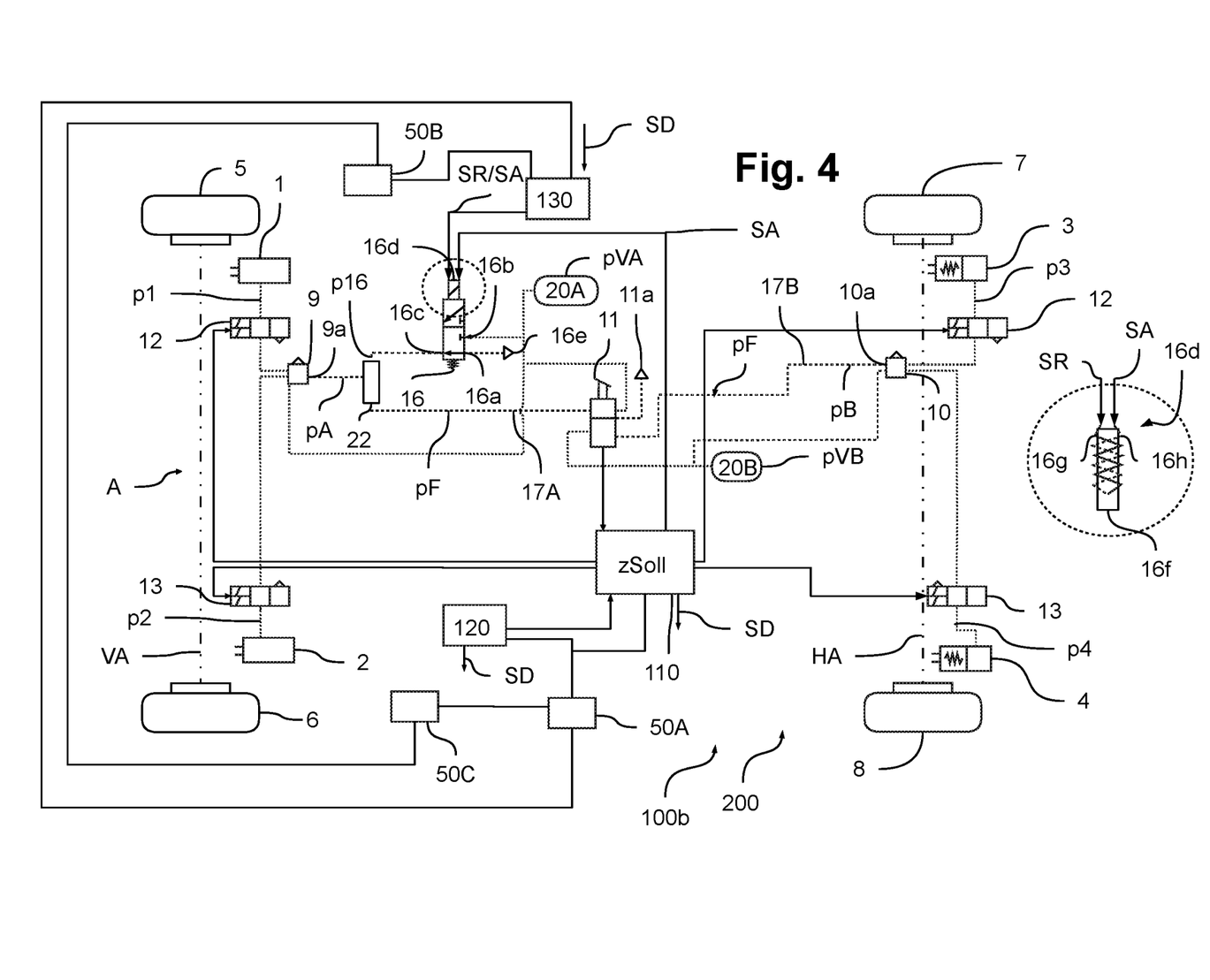
FIGS. 4, 5 illustrate brake systems according to further embodiments of the invention having purely pneumatic actuation of service brakes.
Figure 5:
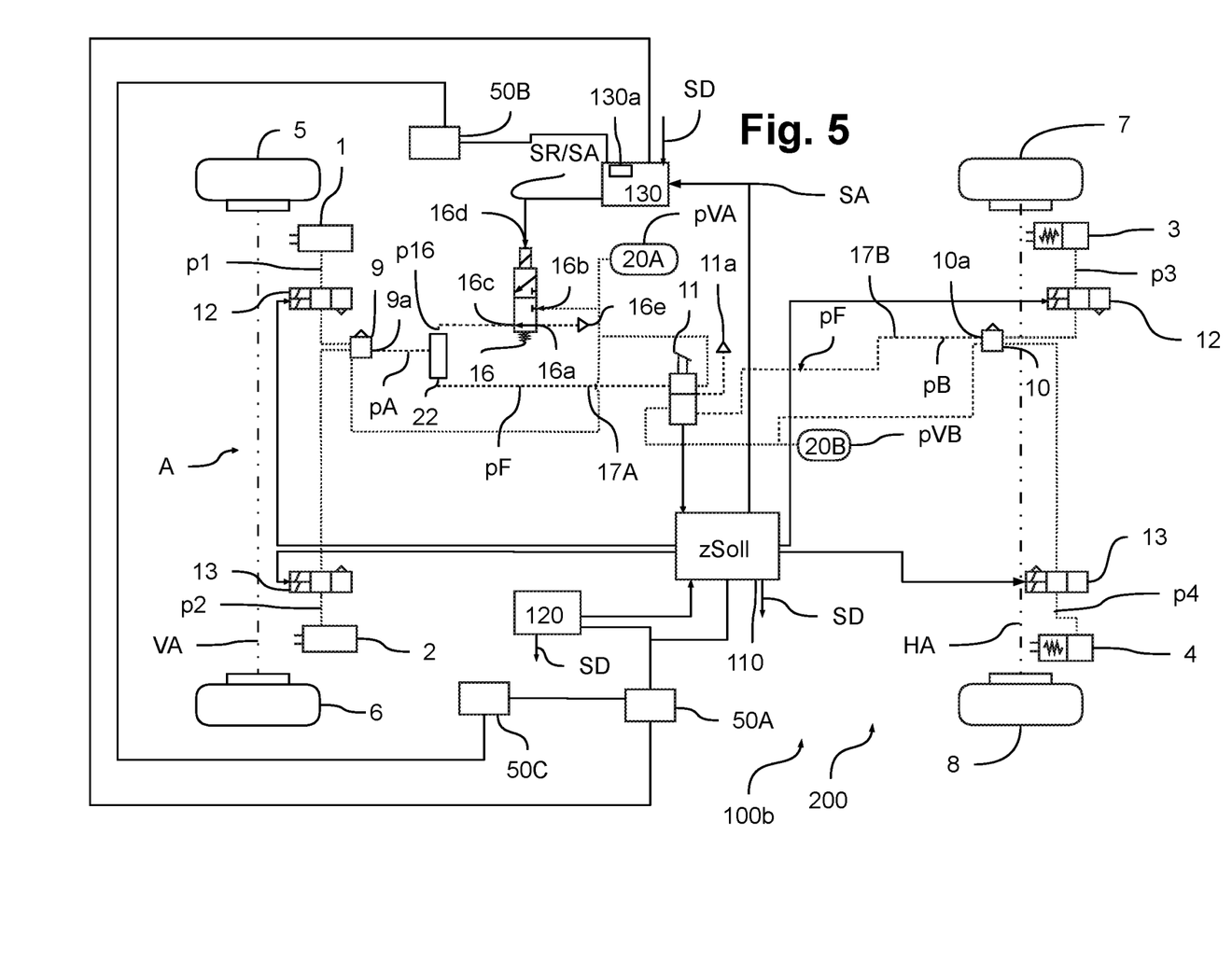

In accordance with FIG. 4 and FIG. 5 a purely pneumatic brake system 100b is illustrated without electronic actuation of the axle modulators 9, 10. In other words, in the first and in the second braking circuit A, B a braking procedure is made by means of a pneumatic specification by means of actuating the foot brake valve 11. The ABS control valves 12, 13 at the front axle VA and the rear axle HA, via which it is possible, controlled by the service brake control unit 110, to react to a brake slip event at one of the wheels 5, 6, 7, 8 of the front axle VA or the rear axle HA, are electronically actuated. It is also possible to actuate the brakes 1, 2 at the front axle VA in an electrically controlled manner via the additional pilot valve 16 in the first braking circuit A. For this purpose, a select high valve 22 is provided in the first control line 17A, to which the actuating pressure pF as well as a pilot pressure p16 that is specified by the pilot valve 16 are input. The select high valve 22 outputs the higher of the two pressures pF, p16 as the first service brake control pressure pA to the first pneumatic control input 9a of the first axle modulator 9, so that the latter outputs either an electrically specified target or a manually specified target.

In accordance with the embodiment in FIG. 4, the pilot valve 16 is connected via the electrical pilot control input 16d both to the redundancy control unit 130 as well as to the service brake control unit 110. In the normal operation, the service brake control unit 110 is able to transmit to the pilot control input 16d a first control signal SA that corresponds to the specified vehicle desired deceleration zSoll. The pilot valve 16 is switched into the first or the second switch position Z1, Z2 in dependence upon said control signal. As a consequence, an electrically requested braking procedure may also be implemented in a purely pneumatic brake system 100b of this type. Hence, in accordance with this embodiment, the pilot valve 16 is used not only for the redundancy case but also in normal operation for the purpose of being able to realize an electrical braking request in particular from an external system like a distance controlling system (ACC).

However, on account of the connection of the electrical pilot control input 16d to the redundancy control unit 130, a redundant electrical control procedure is also possible in that a redundancy signal SR is output by the redundancy control unit 130 in dependence upon which the pilot valve 16 may be switched into the switch positions Z1, Z2. In the event of a failure of the service brake control unit 110 or of the electrical transmission to the pilot valve 16, a redundant braking procedure may consequently be performed even if a higher-ranking braking request from the driver is not present via the select high valve 22.

The pilot control input 16d is embodied in accordance with this embodiment by way of example with a double-wound solenoid armature 16f, wherein a first winding 16g is energized in dependence upon the redundancy signal SR and a second winding 16h is energized in dependence upon the first control signal SA. As soon as at least one of the windings 16g, 16h is energized, the solenoid armature 16f opens and as a consequence switches the pilot valve 16 into the second switch position Z2.

Consequently, the pilot valve 16 may be switched by the two control units 110, 130.

In accordance with an alternative actuating procedure that is illustrated in FIG. 5, the pilot control input 16d is electrically connected only to the redundancy control unit 130. In this case, the service brake control unit 110 transmits the first control signal SA to the redundancy control unit 130. This redundancy control unit comprises a diode connection 130a that disconnects an end stage of the redundancy control unit 130 from an end stage of the service brake control unit 110. The redundancy control unit 130 may consequently transmit either the first control signal SA, which is transmitted by the service brake control unit 110, to the pilot valve 16 or may itself output the redundancy signal SR to the pilot valve 16 if for instance an electrical failure or defect D in the service brake control unit 110 and/or in the assistance control unit 120, or any other transmission error exist, that prevent the first control signal SA being output to the pilot valve 16.

Consequently, a redundant electrical actuation via the pilot valve 16 is possible both in FIG. 4 as well as in FIG. 5.

Both in FIG. 4 as well as in FIG. 5 the first pilot input 16a of the pilot valve 16 is connected to a pilot venting 16e and the second pilot input 16b is connected to the first pressure medium reservoir 20A that is allocated to the first braking circuit A. The pilot output 16c is connected to the select high valve 22 in order to impose the pilot pressure p16. If a braking request is not provided via the foot brake valve 11, in other words if the actuating pressure pF is low and an electrical braking procedure is requested via the pilot valve 16, a pilot pressure p16 is output by the select high valve 22 as a first service brake control pressure pA for the first braking circuit A, which pilot pressure p16 is dependent upon the switch position Z1, Z2 of the pilot valve 16. In other words, the first service brake control pressure pA is specified in this exemplary embodiment either in dependence upon the atmospheric pressure pAtm in the pilot venting 16e or in dependence upon the first reservoir pressure pVA.

Depending upon the switch position Z1, Z2, the pilot valve 16 consequently outputs, as pilot pressure p16, a high pressure level pHigh, i.e. the first reservoir pressure pVA, or a low pressure level pLow, i.e. the atmospheric pressure pAtm.

In the embodiments in accordance with FIG. 4 and FIG. 5, too, an intermittent braking procedure SF can be initiated using the pilot model VM in the redundancy case, in that alternately a switching back and forth between the first and the second switch position Z1, Z2 takes place, wherein, in this case too, pulse times t1 and pause times t2 are to be selected that are adjusted to the embodiment of the commercial vehicle 200. In this case, it is to be taken into account that switching between the atmospheric pressure pAtm and the first reservoir pressure pVA takes place independent of the actuation of the foot brake valve 11, which simplifies the pilot model VM.

Figure 6:
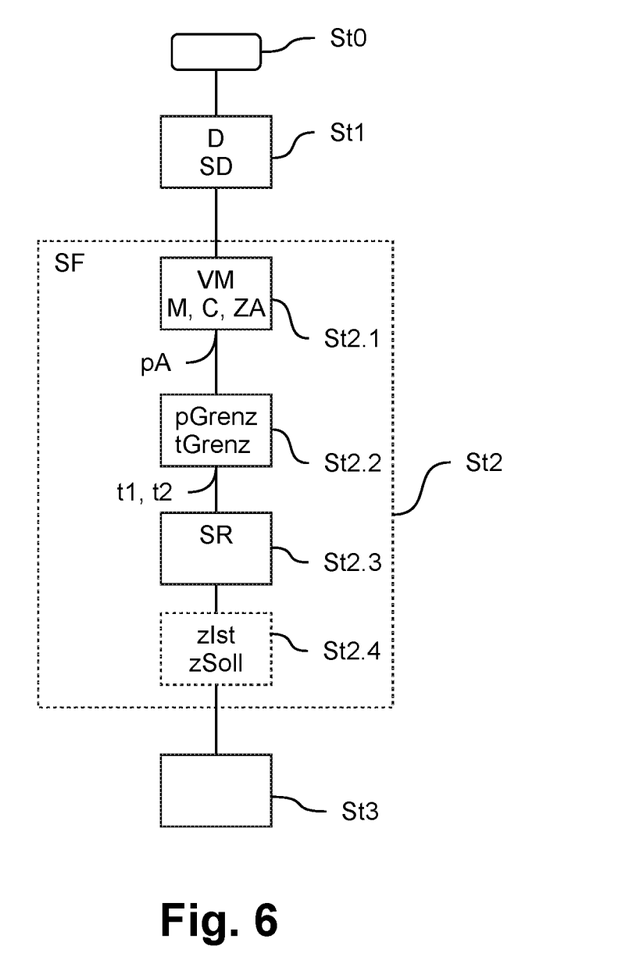
FIG. 6 illustrates a flow diagram for implementing a method according to an embodiment of the invention.

The brake systems 100a, 100b may be actuated in accordance with FIG. 6 by way of example in the following manner:

In a starting step St0, the method starts by way of example by starting the vehicle 200.

In a first step St1 it is determined via the diagnostic signal SD from the redundancy control unit 130 whether a failure or a defect D exists in the electrical actuation of the axle modulators 9, 10 or the pilot valve 16 by the service brake control unit 110 and/or the assistance control unit 120.

If this is the case, in a second step St2 a pulse-width modulated redundancy signal SR is generated by the redundancy control unit 130. In order to achieve an intermittent braking procedure SF in the redundancy case and consequently to improve or to maintain the driving stability and the ability to steer, the pulse-width modulated redundancy signal SR initiates a continuous switching procedure between the first and the second switch position Z1, Z2 of the pilot valve 16 with a pulse time t1 and a pause time t2.

For this purpose, in a first intermediate step St2.1 a pilot model VM is used, which is stored on the redundancy control unit 130. The pilot model VM in this case takes into account in particular the vehicle mass M, valve characteristics C, trailer states ZA and also the pressure levels that are switched between when switching back and forth in the first and the second switch position Z1, Z2.

Initially, a service brake control pressure pA that is to be output is calculated on the basis of a vehicle desired deceleration that is specified by the redundancy control unit 130 using the pilot model VM. In this case, by way of example the atmospheric pressure pAtm in the pilot venting 16e or the actuating pressure pF that is specified by the foot brake valve 11 may be assumed as the low pressure level pLow in the first switch position Z1. The first reservoir pressure pVA is assumed as the high pressure level pHigh in the second switch position Z2. Switching back and forth effects an alternation between the corresponding low pressure level pLow and the high pressure level pHigh.

By taking into account the prerequisite for implementing an intermittent braking procedure SF that the service brake control pressure pA recurrently must remain below the limit pressure pGrenz of e.g. 1 bar at least for the limit time tGrenz of e.g. 0.25 s, a pulse time t1 and a pause time t2 are then calculated in a second intermediate step St2.2 using the pilot model VM, and subsequently in a third intermediate step St2.3 the redundancy signal SR is generated and output to the pilot valve 16.

As a consequence, in a third step St3, by means of the intermittent braking procedure SF, the vehicle 200 is able to be braked into a safe state using the specified vehicle desired deceleration zSoll.

In an optional fourth intermediate step St2.4, the pulse time t1 and the pause time t2 may be controlled by means of adjusting the pilot model VM in such a manner that when implementing the intermittent braking procedure SF the vehicle actual deceleration z1st corresponds approximately to the specified vehicle desired deceleration zSoll. A deviation may occur by way of example by virtue of the fact that the pilot model VM assumes false values for the vehicle mass M or a false trailer state ZA. Furthermore, the first reservoir pressure pVA may change during the implementation of the intermittent braking procedure SF with the result that the first service brake control pressure pA also changes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1, 2, 3, 4 Wheel brake
5, 6, 7, 8 Wheels
9 First axle modulator
9a First pneumatic control input
10 Second axle modulator
10a Second pneumatic control input
11 Foot brake valve
11a Venting connection
12, 13 ABS control valves
16 Pilot valve
16a First pilot input
16b Second pilot input 16c Pilot output
16d Pilot control input
16e Pilot venting
16f Solenoid armature
16g, 16h First and second winding around the solenoid armature 16f
17A, 17B Control line for the respective braking circuit A, B
20A First pressure medium reservoir for braking circuit A
20B Second pressure medium reservoir for braking circuit B
22 Select high valve
50A First energy source
50B Second energy source
50C Generator
50D Short-term storage device
50E High voltage storage device
100a Electropneumatic brake system
100b Purely pneumatic brake system
110 Service brake control unit (ECU)
120 Assistance control unit (ADAS-ECU)
130 Redundancy control unit (Bypass-ECU)
130a Diode connection
200 Vehicle
A, B Braking circuits
C Valve characteristic
D Defect
p1, p2, p3, p4 Service brake braking pressure
p16 Pilot pressure
p16pwm Pilot pressure curve
pA, pB Service brake control pressure of the respective braking circuits A, B
pAtm Atmospheric pressure
pF Actuating pressure
pGrenz Limit pressure
pHigh High pressure level
pLow Low pressure level
pVA, pVB Reservoir pressure in the respective pressure medium reservoir 20A, 20B
SA, SB Control signal
SD Diagnostic signal
SF Intermittent braking procedure
SR Redundancy signal
t Point in time
t1 Pulse time
t2 Pause time
tGrenz Limit time
VA, HA Vehicle axles
vFzg Vehicle speed
VM Pilot model
Z1 First switch position
Z2 Second switch position
ZA Trailer state
zSoll Vehicle desired deceleration
zIst Vehicle actual deceleration
St1, St2, St2.1, St2.2, Steps of the method
St2.3, St2.4, St3

The invention claimed is:

1. A method for electronically controlling a pneumatic brake system in a vehicle, the method comprising:
determining that a failure or a defect has occurred in electronic actuation of wheel brakes of the pneumatic brake system; and
electronically actuating a pilot valve via a redundancy signal in response to determining that the failure or the defect in the electronic actuation has occurred so as to actuate the wheel brakes in a redundant electropneumatic manner,
wherein the redundancy signal is specified in such a manner that the pilot valve alternately turns for a pulse time into a second switch position and for a pause time into a first switch position,
wherein the pilot valve outputs, as a pilot pressure, a low pressure level in the first switch position and a high pressure level in the second switch position,
wherein the wheel brakes are actuated using a service brake braking pressure that is dependent upon the pilot pressure,
wherein the pulse time and the pause time are set in such a manner that the pilot pressure results that initiates, at the wheel brakes, a service brake braking pressure that recurrently drops at least for a limit time below a limit pressure so as to initiate an intermittent braking procedure, and
wherein the limit pressure and the limit time are set such that just specifying the pilot pressure ensures that a wheel that tends to lock rotates again.

2. The method as claimed in claim 1, wherein a locked wheel rotates again by way of the imposed pilot pressure even if ABS control valves of the brake system have failed.

3. The method as claimed in claim 1, wherein the low pressure level is specified by means of an actuating pressure from a foot brake valve or by an atmospheric pressure of a pilot venting.

4. The method as claimed in claim 1, wherein the high pressure level is specified by means of a pressure medium reservoir that is allocated to braking circuits of the vehicle.

5. The method as claimed in claim 1, wherein the pulse time and the pause time are calculated on the basis of a pilot model that is stored on a redundancy control unit,
wherein the pilot pressure that is to be output is calculated using the pilot model from a vehicle desired deceleration that is specified by means of the redundancy control unit and in dependence upon the pilot pressure the pulse time and the pause time for actuating the pilot valve via the redundancy signal are calculated taking into account vehicle parameters, the high pressure level, the low pressure level, and also the limit time and the limit pressure.

6. The method as claimed in claim 5, wherein the vehicle parameters comprise at least one of a valve characteristic, a vehicle mass, or a trailer state.

7. The method as claimed in claim 5, wherein the pilot model and/or the pulse time and/or the pause time is adjusted during implementation of an intermittent braking procedure, in dependence upon whether a vehicle actual deceleration corresponds to the vehicle desired deceleration that is specified by the redundancy control unit.

8. The method as claimed in claim 5, wherein the pilot model and/or the pulse time and/or the pause time is/are adjusted during implementation of an intermittent braking procedure in dependence upon whether the high pressure level and/or the low pressure level and/or the vehicle parameters change during implementation of the intermittent braking procedure.

9. The method as claimed in claim 1, wherein the limit pressure amounts to 1 bar and the limit time amounts to 0.25 s.

10. The method as claimed in claim 9, wherein in order to initiate the intermittent braking procedure the pulse time is 0.1 s and the pause time is 0.2 s or the pulse time is 0.3 s and the pause time is 0.45 s.

11. The method as claimed in claim 1, wherein the pulse time and the pause time or the limit time and the limit pressure are based on frictional values of at least 0.6.

12. The method as claimed in claim 1, wherein a failure or a defect in the electronic actuation is identified via a diagnostic signal that is output by a service brake control unit that controls the wheel brakes electronically and/or by an assistance control unit.

13. The method as claimed in claim 1, wherein the electrical actuation of the pilot valve is performed using the redundancy signal in a first braking circuit at a front axle and/or in a second braking circuit at a rear axle of the vehicle.

14. The method as claimed in claim 1, wherein the pilot pressure specifies a service brake control pressure for pneumatically actuating an axle modulator or directly specifies the service brake braking pressure for actuating the wheel brakes.

15. The method as claimed in claim 1, wherein a redundancy control unit that controls the pilot valve in the event of a failure or a defect in the electronic actuation of the wheel brakes is supplied with energy by a second energy source and/or by a generator and/or by a short-term storage device and/or by a high voltage storage device in addition to or as an alternative to a first energy source.

16. An electronically controllable pneumatic brake system in a vehicle the electronically controllable pneumatic brake system being configured to perform a method for electronically controlling a pneumatic brake system in a vehicle, the method comprising:
- determining that a failure or a defect has occurred in electronic actuation of wheel brakes of the pneumatic brake system;
- electronically actuating a pilot valve via a redundancy signal in response to determining that the failure or the defect in the electronic actuation has occurred so as to actuate the wheel brakes in a redundant electropneumatic manner;
- wherein the redundancy signal is specified in such a manner that the pilot valve alternately turns for a pulse time into a second switch position and for a pause time into a first switch position,
- wherein the pilot valve outputs, as a pilot pressure, a low pressure level in the first switch position and a high pressure level in the second switch position,
- wherein the wheel brakes are actuated using a service brake braking pressure that is dependent upon the pilot pressure,
- wherein the pulse time and the pause time are set in such a manner that the pilot pressure results that initiates, at the wheel brakes, a service brake braking pressure that recurrently drops at least for a limit time below a limit pressure so as to initiate an intermittent braking procedure,
- wherein the limit pressure and the limit time are set such that just specifying the pilot pressure ensures that a wheel that tends to lock rotates again, and
- wherein the brake system is an EBS brake system or a purely pneumatic brake system.

17. The electronically controllable pneumatic brake system as claimed in claim 16, wherein the pilot valve is arranged in a first braking circuit that is allocated to a front axle and/or in a second braking circuit that is allocated to a rear axle.

18. The electronically controllable pneumatic brake system as claimed in claim 16, wherein the pilot valve comprises a pilot control input and the pilot control input is connected to a redundancy control unit that outputs the redundancy signal and/or to a service brake control unit that outputs the control signal so as to output the pilot pressure in dependence upon the redundancy signal and/or in dependence upon the control signal.

19. The electronically controllable pneumatic brake system as claimed in claim 18, wherein the pilot control input is only connected to the redundancy control unit and the redundancy control unit is connected to the service brake control unit so as to enable transmission of the control signal from the service brake control unit to the redundancy control unit,
- wherein the redundancy control unit comprises a diode circuit for outputting the redundancy signal or the control signal to the pilot control input in a decoupled manner.

20. The electronically controllable pneumatic brake system as claimed in claim 18, wherein the pilot control input is connected to the redundancy control unit and the service brake control unit,
- wherein the pilot control input comprises a double-wound solenoid armature, wherein a first winding is electrically operatively connected to the redundancy control unit and a second winding is electrically operatively connected to the service brake control unit in such a manner that the solenoid armature is moved in dependence upon the redundancy signal or in dependence upon the control signal in order to switch the pilot valve into the second switch position.

21. A vehicle having an electronically controlled pneumatic brake system as claimed in claim 16.

* * * * *